(12) United States Patent
Koops et al.

(10) Patent No.: US 7,393,099 B2
(45) Date of Patent: Jul. 1, 2008

(54) GLASSES

(75) Inventors: Daniel Koops, Amsterdam (NL); Erik Ad Hermans, Amsterdam (NL); Willem Berend Bloem, Amsterdam (NL); Gerrit Ludolph Van Der Heijde, Amsterdam (NL)

(73) Assignee: Stichting Right on Sight, Vessen (NL)

( * ) Notice: Subject to any disclaimer, the term of this patent is extended or adjusted under 35 U.S.C. 154(b) by 0 days.

(21) Appl. No.: 11/830,249

(22) Filed: Jul. 30, 2007

(65) Prior Publication Data

US 2008/0030678 A1 Feb. 7, 2008

Related U.S. Application Data

(63) Continuation-in-part of application No. PCT/NL2006/000055, filed on Feb. 1, 2006.

(30) Foreign Application Priority Data

Feb. 2, 2005 (NL) .................................. 1028171

(51) Int. Cl.
*G02C 9/02* (2006.01)

(52) U.S. Cl. .......................... 351/59; 351/57

(58) Field of Classification Search .................. 351/59, 351/57, 58, 47, 48, 41, 158
See application file for complete search history.

(56) References Cited

U.S. PATENT DOCUMENTS

| 3,305,294 | A | | 2/1967 | Alvarez |
| 3,838,913 | A | * | 10/1974 | Schwarz ...................... 351/47 |
| 5,644,374 | A | | 7/1997 | Mukaiyama et al. |
| 6,356,400 | B1 | * | 3/2002 | Goff et al. .................... 359/802 |
| 7,175,274 | B1 | * | 2/2007 | Markson ...................... 351/59 |

FOREIGN PATENT DOCUMENTS

EP 1433415 8/2004

* cited by examiner

*Primary Examiner*—Hung X Dang
(74) *Attorney, Agent, or Firm*—Jeffrey D. Myers; Peacock Myers, P.C.

(57) ABSTRACT

Glasses for everyday use, comprising a frame into which is fitted a lens system for the correction of defective vision, which comprises at least one pair of lenses formed by a first lens and a second lens, which first and second lens, viewed in the path of vision, are disposed one behind the other and are mutually adjustable for realizing a desired degree of correction of vision, wherein the first lens is coupled with a first adjusting element and the second lens is coupled with a second adjusting element, and the first and the second adjusting elements in the assembled state form an integral component of an adjusting organ, and are designed for moving one along the other for the purpose of an adjustment of the lenses.

6 Claims, 2 Drawing Sheets

GLASSES

CROSS-REFERENCE TO RELATED APPLICATIONS

This application is a continuation-in-part application of Patent Cooperation Treaty (PCT) Serial No. PCT/NL2006/000055, entitled "Glasses", to Stitching Right on Sight filed on Feb. 1, 2006, and the specification and claims thereof are incorporated herein by reference.

This application claims priority to and the benefit of the filing of Netherlands Patent Application Serial No. 1028171, entitled "LENSSYSTEEM", to Vereniging Voor Christelijk Hoger Onderwijs Wetenschappelijk Onderzoek en Patientenzorg, filed on Feb. 2, 2005, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to glasses for everyday use, comprising a frame into which is fitted a lens system for the correction of defective vision, which comprises at least one pair of lenses formed by a first lens and a second lens, which first and second lens, viewed in the path of vision, are disposed one behind the other and are mutually adjustable for realizing a desired degree of correction of vision.

2. Description of Related Art

Glasses with such a lens system are known, for example, from U.S. Pat. No. 5,644,374.

BRIEF SUMMARY OF THE INVENTION

The object of the invention is to provide such glasses wherein the adjustment for realizing the desired degree of correction of vision is very simple to carry out, and can easily be modified as required.

To this end the glasses according to the invention are characterized, in that the first lens is coupled with a first adjusting element and the second lens is coupled with a second adjusting element, and in that in the assembled state the first and the second adjusting elements form an integral component of an adjusting organ, and are designed for moving one along the other for the purpose of an adjustment of the lenses.

The glasses according to the invention are adjusted simply by moving the first adjusting element and the second adjusting element in relation to each other and subsequently, when the desired correction of vision has been realized, to fix them in the position reached.

It is observed that a lens system, of which the first lens is coupled with a first adjusting element and the second lens is coupled with a second adjusting element, and wherein the first and the second adjusting elements in the assembled state form an integral component of an adjusting organ, and are designed for moving one along the other for the purpose of adjusting the lenses is known as such from EP-A-I 433 415. However, this publication does not concern glasses for everyday use but an eye refraction system of which such a lens system forms a part.

To facilitate easy adjustment, it is desirable for the first adjusting element and the second adjusting element to be provided with a first and second thread, respectively.

An embodiment of the glasses according to the invention that is convenient and simple to operate is characterized, in that the adjusting organ comprises a spindle rod, circumferentially provided with at least a third and a fourth thread designed to engage the first and second thread, respectively, of the first and second adjusting element.

The pitch of both the first and the second thread of the adjusting elements as well as of the third and fourth threads of the spindle rod run counter to one another.

In order to facilitate the operation it is further desirable for the adjusting organ to be incorporated in the frame, and for the spindle rod to have an operating organ that projects at least beyond the outer side of said frame.

A sturdy embodiment of the glasses according to the invention is characterized, in that one of the two adjusting elements of the adjusting organ is fixed and integrated with the frame, and the other adjusting element is designed for movement along the adjusting element integrated with the frame, for the purpose of adjusting the lenses in relation to each other.

Hereinafter the invention will be further elucidated by way of a preferred embodiment of the glasses according to the invention, without limiting the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
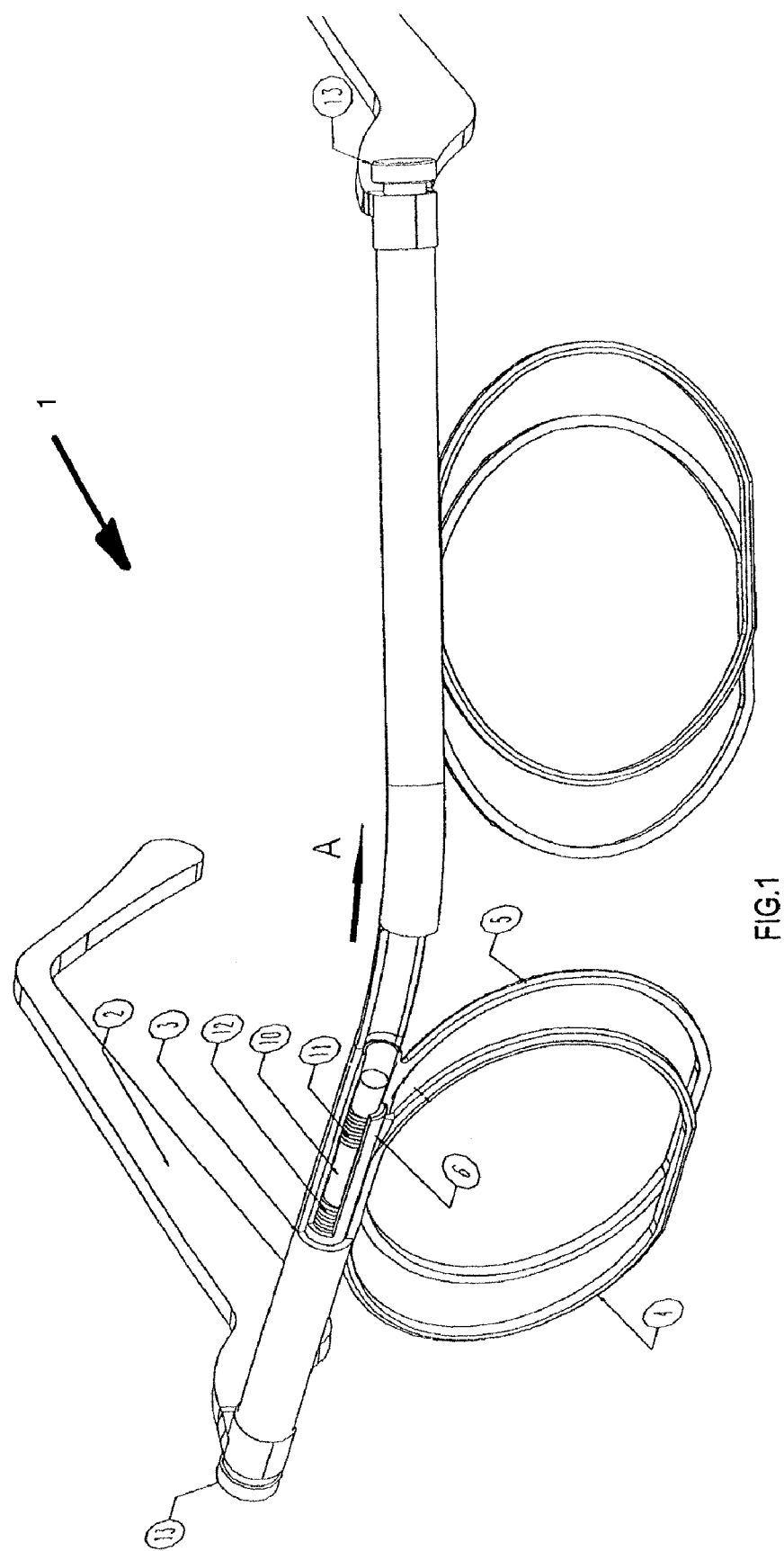
FIG. 1 shows a part of the glasses according to the invention.

Identical reference numerals in the figures refer to similar parts.

FIG. 1 shows a part of a pair of glasses 1. These glasses 1 are provided with temples, one temple 2 being shown in FIG. 1.

The temple 2 is linked to a bridge piece 3 of a frame, which in a manner well-known to the person skilled in the art, continues in the direction of arrow A forming a mirror-image part of the glasses 1, where the glasses are provided with a second temple.

Linked to the bridge piece 3 is a pair of lenses 4, 5 comprised of a first lens 4 and a second lens 5.

Viewed in the path of vision, the first lens 4 and the second lens 5 are disposed one behind the other and are mutually adjustable for realizing a desirable degree of correction of vision in said path of vision.

The desirable correction of vision is realized in accordance with the above-mentioned publication U.S. Pat. No. 5,644,374 or more generally in accordance with U.S. Pat. No. 3,305,294.

To this end the first lens 4 is coupled with a first adjusting element 6 and the second lens 5 is coupled with a second adjusting element 7.

Figure 2:
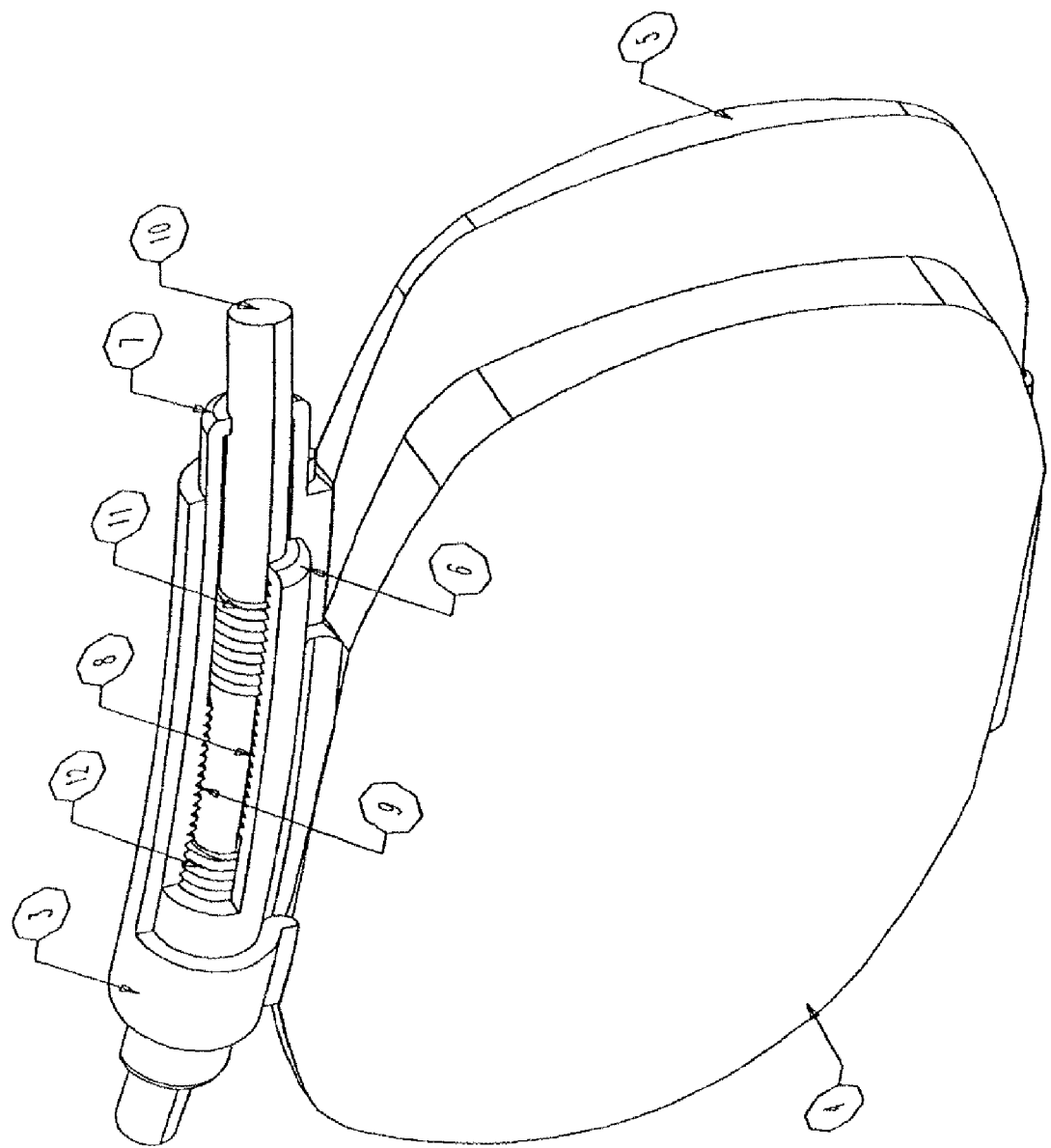
FIG. 2 shows a detail of the glasses shown in FIG. 1.

One thing and another is further elucidated by way of FIG. 2, which shows in detail the pair of lenses comprised of the first lens 4 and the second lens 5, together with the first adjusting element 6 and the second adjusting element 7 coupled thereto.

With respect to this first adjusting element 6 and the second adjusting element 7 it is observed that in the assembled state, they form an integral component of an adjusting organ, which in the present case is incorporated in the bridge piece 3 of a frame. The first adjusting element 6 and the second adjusting element 7 are designed to act together such as to implement an adjustment of the first lens 4 and the second lens 5, that corresponds to the desired degree of correction of vision. FIG. 2 shows an exploded view of the bridge piece 3 that incorporates the first adjusting element 6 and the second adjusting element 7, so as to illustrate that the first adjusting element 6 has a first thread 8 and correspondingly, that the second adjusting element 7 is provided with a second thread 9.

As is shown in FIG. 1, the glasses 1 according to the invention further comprise a spindle rod 10 which, together with the first adjusting element 6 and second adjusting element 7, is incorporated in the bridge piece 3 of a frame. Said spindle rod 10 is circumferentially provided with a third thread 11, which is designed to engage the first thread 8 of the first adjusting element 6, and with a fourth tread 12 that engages the second thread 9 of the second adjusting element 7.

The pitch of the first thread 8 of the first adjusting element 6 and of the second thread 9 of the second adjusting element 7 run counter to each other, as do the pitch of the third 11 and fourth 12 thread provided on the spindle rod 10.

It is worth mentioning that it is also possible to provide only one of the two adjusting elements with the above-elucidated thread for engaging the threaded rod. The other adjusting element may then be embodied without thread and in a fixed position, for example, as part of the frame. In this embodiment, only one of the lenses is adjustable and the other lens is unadjustably mounted in the frame. Nevertheless, it is possible to adjust the lenses in relation to each other by operating the threaded rod and through the ensuing adjustment of the moveable adjusting element with which the adjustable lens is coupled.

With regard to operating the adjusting organ 6, 7, and 10, it is for all possible embodiments preferred that the spindle rod 10 at the outward side of the temple 2 be provided with a conveniently controllable operating organ 13.

The other side of the glasses may also be provided with such an operating organ 13.

What is claimed is:

1. Glasses for everyday use, comprising a frame into which is fitted a lens system for the correction of defective vision, which comprises at least one pair of lenses formed by a first lens and a second lens, which first and second lens, viewed in the path of vision, are disposed one behind the other and are mutually adjustable for realizing a desired degree of correction of vision, wherein the first lens is coupled with a first adjusting element and the second lens is coupled with a second adjusting element, and wherein the assembled state the first and the second adjusting elements form an integral component of an adjusting organ, and are designed for moving one along the other for the purpose of an adjustment of the lenses.

2. Glasses according to claim 1, wherein the first adjusting element and the second adjusting element are provided with a first and second thread, respectively.

3. Glasses according to claim 2, wherein the adjusting organ comprises a spindle rod, circumferentially provided with a third and a fourth thread designed to engage the first and second thread, respectively, of the first and second adjusting element, respectively.

4. Glasses according to claim 3, wherein the pitch of the first and the second thread run counter to one another.

5. Glasses according to claim 3, wherein the adjusting organ is incorporated in the frame, and wherein the spindle rod has an operating organ that projects at least beyond the outer side of said frame.

6. Glasses according to claim 1, wherein one of the two adjusting elements of the adjusting organ is fixed and integrated with the frame, and the other adjusting element is designed for movement along the adjusting element integrated with the frame, for the purpose of adjusting the lenses in relation to each other.

\* \* \* \* \*